US005647515A

United States Patent [19]

Zwijnenberg et al.

[11] Patent Number: 5,647,515

[45] Date of Patent: Jul. 15, 1997

[54] STEPPING PLUNGER FOR AIR-ACTIVATED DISPENSING SYSTEM

[76] Inventors: Lambertus Herman Zwijnenberg, Steenmatenweg 3, 7636 PM Agelo, Netherlands; Bernardus Jozef Driessen, Wilgenstraat 22, 7611 AG Aadorp, Netherlands

[21] Appl. No.: 536,539

[22] Filed: Sep. 29, 1995

[51] Int. Cl.[6] .................... G01F 11/00

[52] U.S. Cl. .................... 222/389; 222/391

[58] Field of Search .................... 222/61, 386, 389, 222/391

[56] References Cited

U.S. PATENT DOCUMENTS

| | | | |
|---|---|---|---|
| 1,042,627 | 10/1912 | Watson | 222/389 |
| 1,661,521 | 3/1928 | Zimmerman | 222/389 |
| 2,845,805 | 8/1958 | Crewe | 222/391 X |
| 3,076,225 | 2/1963 | Sherbondy | 222/391 X |
| 3,105,614 | 10/1963 | Sherbondy | 222/391 X |
| 4,268,481 | 5/1981 | Suovaniemi et al. | 222/391 X |
| 4,452,285 | 6/1984 | Leibhard et al. | 222/391 X |

*Primary Examiner*—Joseph Kaufman
*Attorney, Agent, or Firm*—George T. Noe

[57] ABSTRACT

An dispensing system is provided with a stepping plunger to minimize the air buffer at develops as material is dispensed. The stepping plunger includes a plunger body having an air passage therethrough for insertion into a syringe containing a material to be dispensed, A plunger rod having an air passage therethrough is attached at one end to the plunger body, and at the other end to an air hose. The plunger rod has a plurality of equally-spaced detents distributed along at least a portion of its the length, and a detent pin is urged into contact with at least one of said detents under spring bias. The detents are ramped to permit the plunger rod and said plunger body to move axially in one direction while being prevented from moving the opposite direction. The plunger body follows the level of material in said syringe as it is dispensed while maintaining a substantially zero air buffer in said syringe.

1 Claim, 1 Drawing Sheet

STEPPING PLUNGER FOR AIR-ACTIVATED DISPENSING SYSTEM

BACKGROUND OF THE INVENTION

This invention relates generally to air-activated dispensing systems for dispensing viscous materials such as glue or solder paste, and in particular to an air-activated dispensing system having a stepping plunger to eliminate the air buffer that develops as material is dispensed.

In manufacturing electronic equipment, one step in the process involves mounting electronic components on circuit boards, ceramic substrates, or other media. In some instances, a component is simply glued to a circuit board until the component leads are soldered, for example, by well-known wave soldering techniques. In other instances, a component may be soldered into place using paste solder dispensed onto a board at a particular location and applying localized heat. Accordingly, dispensing machines are provided which dispense viscous materials such as glue and solder paste onto the surface of a medium such as a printed circuit board at predetermined locations.

Typically, prior art dispensing systems are activated with pulses of air pressure applied via an air line to force a small amount, or "dot," of material from the nozzle of a syringe onto the circuit board. It is important that the dots be uniform in size and material so that problems are not created by having too much or too little material to attach components, and so that material is not wasted.

It can be seen that as more and more material is dispensed from the syringe, the space, or air buffer, inside the syringe becomes larger and larger, replacing the material as it is forced downward and dispensed. This creates a situation in which the dispensed dots get smaller because the air compresses in the air buffer, increasing the response time between the applied air-pressure pulse and movement by material so that material is not dispensed when it should be, and also reducing the dispensing force. In the prior art, attempts to overcome this problem have been less than satisfactory, and typically have involved increasing the air pressure or changing the timing of the air pulses as material is dispensed. However, it becomes increasingly difficult to control the pulse response time and dispensing force as the syringe nears empty.

SUMMARY OF THE INVENTION

In accordance with the present invention, the air-activating dispensing system is provided with a stepping plunger that is placed into the syringe adjacent to the cap on the material. As the material is dispensed from the syringe, and the cap moves downward, the stepping plunger follows the level of the dispensed mass, maintaining a substantially "zero" air buffer.

The stepping plunger has a resilient seal, such as an O ring, which contacts the inner wall of the syringe. The system's air line is connected directly to a tube which passes through the plunger rod and plunger. As material is dispensed, a vacuum pulse is periodically applied, evacuating any air in the air buffer and pulling the plunger downward onto the cap.

A ratchet mechanism permits the plunger to move downward in incremental steps, and prevents the plunger from moving upward. The ratchet mechanism comprises a spring-loaded detent pin, oriented transverse to the axis of the plunger rod, that impinges against a series of ramped detents along the length of the plunger rod. As the plunger moves downward when the vaccum pulses are applied, the detent pin moves along a ramp and then snaps into a new detent position, preventing upward movement when the air pressure pulses are applied.

Thus, the stepping plunger follows the material down in the syringe as it is dispensed, and the air buffer is maintained near or at zero level. Without the air buffer, the air cannot compress, and consequently the dispensing air pressure may be substantially uniform throughout the dispensing process, resulting in uniform dispensed dots.

It is therefore one object of the present invention to provide an improved air-activated material dispensing system.

It is a feature of the present invention to provide a stepping plunger for an air-activated dispensing system to minimize the air buffer that develops as material is dispensed.

It is another feature of the present invention to provide an air-activated dispensing system with a stepping plunger to ensure uniform dispensing of material.

Other objects, features, and advantages of the present invention will become obvious to those having ordinary skill in the art upon a reading of the following description when taken in conjunction with the accompanying drawings.

DETAILED DESCRIPTION OF THE INVENTION

Figure 1:
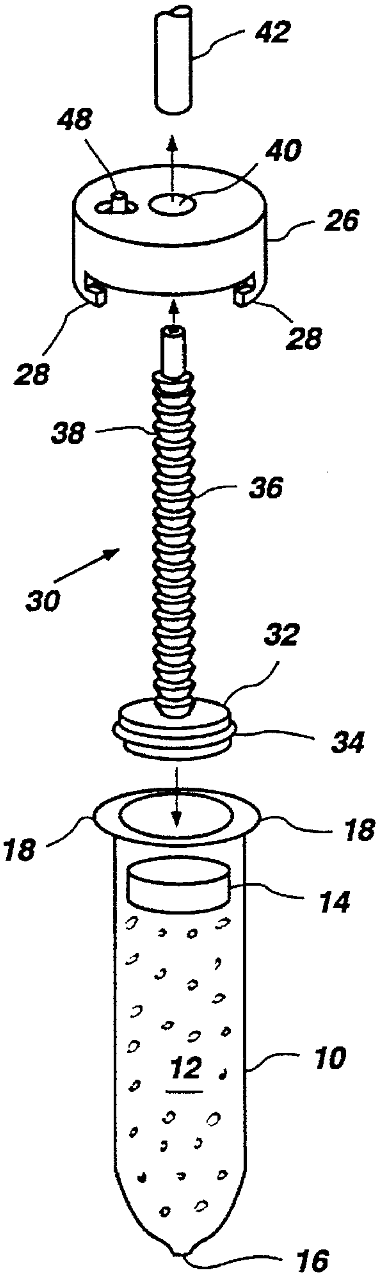
FIG. 1 is a diagram of an air-activated material dispensing system in accordance with the present invention.

Referring to FIG. 1 of the drawings, there is shown a typical conventional syringe 10 containing a viscous material 12 such as glue or solder paste to be dispensed. The viscous material 12 is capped by a material cap 14, which moves downward in the syringe 10 as material dispensed through an orifice 16. The top of the syringe has a pair of gripping projections 18 in the conventional manner.

A syringe cap 26, which may be clamped into place as part of an air-activated dispensing machine (not shown), includes a pair fingers 28 which engage the gripping projections 18 of syringe 10 and hold the syringe firmly in place during the dispensing operation. The syringe 10 easily may be mounted to the syringe cap 26, or removed therefrom, by rotating the syringe 10 ninety degrees with respect to the syringe cap 26.

A stepping plunger 30 comprises a plunger body 32 having an air passage therethrough and an O-ring 34 around its circumference to provide an air seal and an elongate hollow plunger rod 36 attached at one end to the plunger body 32 is inserted into the syringe 10 so that the plunger body 32 is adjacent to the material cap 14. Plunger rod 36 has a series of ramped detents 38 equally spaced along at least a portion of its exterior. The other end of plunger rod 36 passes through a bore 40 in syringe cap 26, and connects to an air hose 42.

Figure 2:
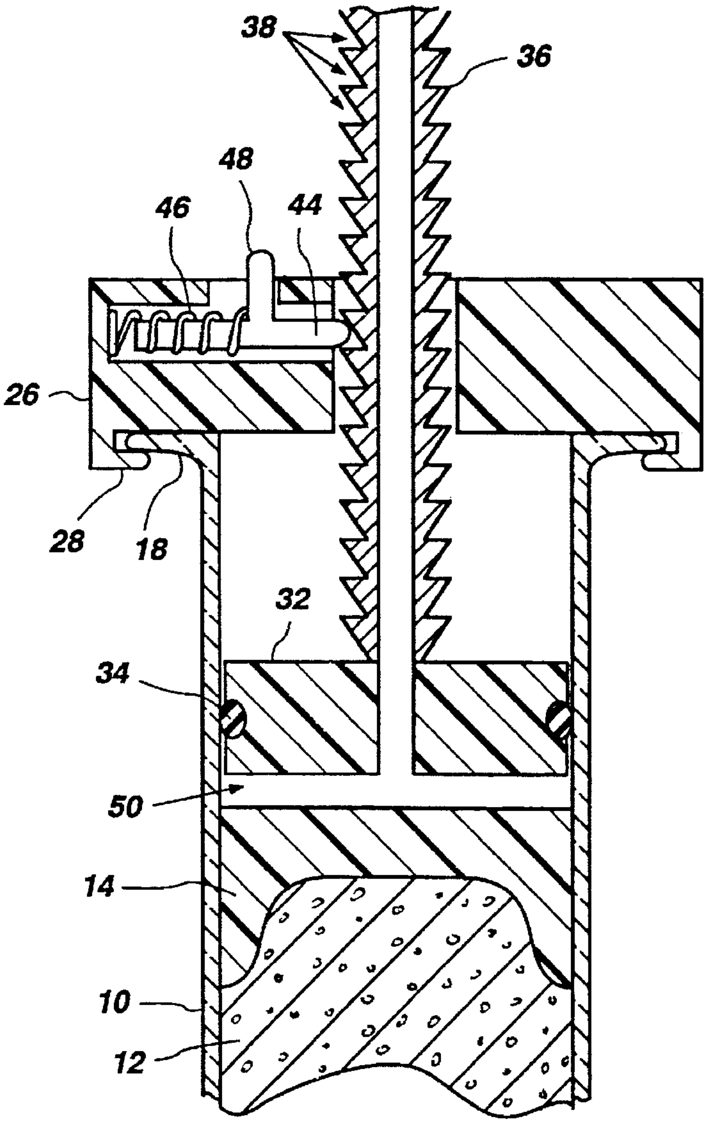
FIG. 2 is a cross section of stepping plunger showing the detent mechanism.

Referring to the cross sectional diagram of FIG. 2, operation of the stepping plunger will be discussed. A detent pin 44 is mounted within syringe cap 26 along an axis transverse to the axis of the stepping plunger 30, and impinges against the exterior surface of plunger rod 36 under pressure of a coil spring 46. The detent pin also has a projection 48 which allows an operator to retract the detent pin against spring pressure permit removal or repositioning of the stepping plunger 30.

To begin operation, a vacuum pulse is applied via air hose 42, evacuating the air chamber or buffer 50 that may exist between faces of plunger body 32 and material cap 14. This causes the plunger body 32 to be pulled down onto the material cap 14, and at the same time, the detent pin 44 rides along the ramped surface of the plunger rod 36 and snaps into a detent 38. Thereafter, when air pulses are applied via air hose 42 and the air passages through plunger rod 36 and plunger body 32, air pressure is applied against the material cap 14, forcing material 12 to be dispensed as detent pin 44 prevents upward movement of the stepping plunger 30.

During the dispensing operation, vacuum pulses are applied periodically to evacuate chamber 50, and the stepping plunger follows the level of the material 12 down, maintaining a substantially zero air buffer in chamber 50.

While we have shown and described the preferred embodiment of our invention, it will be apparent to those skilled in the art that many changes and modifications may be made without departing from our invention in its broader aspects. It is therefore contemplated that the appended claims will cover all such changes and modifications as fall within the true scope of the invention.

What we claim as our invention is:

1. A stepping plunger for an air-activated material dispensing system, comprising:

a plunger body having an air passage therethrough for insertion into a syringe containing a material to be dispensed;

a plunger rod having an air passage therethrough attached at one end to said plunger body, said plunger rod having a plurality of equally-spaced detents distributed along at least a portion of the length thereof; and a detent pin urged into contact with at least one of said detents under spring bias;

wherein said detents are ramped to permit said plunger rod and said plunger body to move axially in one direction while being prevented from moving the opposite direction, and further wherein said plunger body follows the level of material in said syringe while maintaining a substantially zero air buffer in said syringe.

* * * * *